(12) United States Patent
Grassini

(10) Patent No.: US 12,461,369 B2
(45) Date of Patent: Nov. 4, 2025

(54) COMMUNICATION DEVICE FOR FACILITATING VERBAL COMMUNICATION FOR DEAF OR HEARING IMPAIRED PEOPLE

(71) Applicant: HAGA2 S.R.L., Angri (IT)

(72) Inventor: Antonio Grassini, Angri (IT)

(73) Assignee: HAGA2 S.R.L., Angri (IT)

( * ) Notice: Subject to any disclaimer, the term of this patent is extended or adjusted under 35 U.S.C. 154(b) by 0 days.

(21) Appl. No.: 18/567,033

(22) PCT Filed: May 18, 2022

(86) PCT No.: PCT/IB2022/054623
§ 371 (c)(1),
(2) Date: Dec. 5, 2023

(87) PCT Pub. No.: WO2022/259065
PCT Pub. Date: Dec. 15, 2022

(65) Prior Publication Data
US 2024/0264439 A1    Aug. 8, 2024

(30) Foreign Application Priority Data

Jun. 11, 2021  (IT) .......................... 102021000015347

(51) Int. Cl.
*G09G 5/00*  (2006.01)
*G02B 27/01*  (2006.01)
*G09B 21/00*  (2006.01)

(52) U.S. Cl.
CPC ......... *G02B 27/017* (2013.01); *G09B 21/009* (2013.01); *G02B 2027/0138* (2013.01)

(58) Field of Classification Search
CPC .......... G02B 27/017; G02B 2027/0138; G09B 21/009
USPC ............................................................ 345/8
See application file for complete search history.

(56) References Cited

U.S. PATENT DOCUMENTS

| 2014/0337023 | A1* | 11/2014 | McCulloch | G06F 3/011 |
|---|---|---|---|---|
| | | | | 704/235 |
| 2017/0186431 | A1* | 6/2017 | Didik | G10L 21/10 |
| 2023/0238001 | A1* | 7/2023 | Westner | G06F 1/163 |
| | | | | 704/235 |

\* cited by examiner

*Primary Examiner* — Jennifer T Nguyen
(74) *Attorney, Agent, or Firm* — Rivka Friedman

(57) ABSTRACT

A communication device comprises a support structure (2, 102, 202) adapted to be worn by a user at eye level, a first synthesizer (3, 103, 203) integral with the support structure (2, 102, 202) and provided with one or more sensors suitable for detecting the lip produced by the user and turn it into the corresponding words, reproduction means (4, 104, 204) suitable for reproducing sound and/or data corresponding to the words generated by the first synthesizer (3, 103, 203), a second synthesizer (5, 105, 205) suitable to turn into audio and/or word processing the sound and/or data produced by the reproduction means (4, 104, 204) and/or received from the outside.

18 Claims, 5 Drawing Sheets

COMMUNICATION DEVICE FOR FACILITATING VERBAL COMMUNICATION FOR DEAF OR HEARING IMPAIRED PEOPLE

TECHNICAL FIELD

The present invention generally finds application in the field of communication devices and particularly relates to a communication device suitable for facilitating verbal communication for deaf or hearing impaired people or even for hearing persons speaking different languages.

STATE OF THE ART

The known solutions designed to allow verbal communication between deaf or hearing impaired people essentially involve the use of devices and applications aimed at facilitating, with the use of electronics, the communication and relationships of these subjects through the language of signs, which represents, as is well known, a real language from a sociological point of view even if based on the gestures of the hands. Other solutions involve the use of speech synthesizers designed to translate into sound the texts displayed on an electronic device.

However, these solutions do not allow to overcome the barrier that separate the "non-hearing impaired" from the "hearing impaired" people during a communication, but still represent only partial solutions which, while allowing the communication between these subjects, do not make it similar to a verbal communication between non-hearing impaired people.

In addition, it should be noted that there are currently nearly 300 sign languages in the world, which in fact entail a further obvious barrier in communication between hearing impaired people.

Last but not least, in the field of oral communication between able-bodied people with different mother tongues, currently only applications suitable to translate single sentences or at most short periods reproduced by the speech synthesizer present on a device, usually a smartphone, into the chosen language have been improved.

These devices provide that the single translation of one's own communication is received and then made to listen to the other subject, waiting for the relative response to be processed in the same way.

In this way a discontinue communication is realized, only useful for the purpose of brief exchanges of information, not allowing instead a fluid and continuous conversation.

U.S. Pat. No. 6,240,392 discloses a communication device designed to be used by deaf-mute or hearing-impaired people which shares with the present invention almost all the features contained in the preamble of claim 1.

However, the function of inserting the words to be reproduced is entrusted exclusively to an electronic device, such as a PC, tablet or similar, which allows the capture of sounds from the outside or the insertion of short writings, which will then be converted into sounds recognizable by a synthesizer which in turn will transform them into words or symbols visible on a display placed at the user's eye level.

It is evident that this solution is not suitable for allowing fluid communication between people but only serves as an aid to people with hearing impairment in particular emergency solutions.

US2002/194005 discloses a voice recognition device which provides for the use of two or more cameras for the acquisition of the lips placed on the sides of a microphone and whose function is to reproduce and record the positioning and movement of the lips, so that in case of imperfect acquisition of the microphone sound, the vision of the positioning of the lips facilitates the perfect reproduction of the speech in video writing and subsequent printing, filling the deficits found in the audio acquisition by the microphone, without however allowing the transformation into sound of what has been acquired.

Not at least, the need is felt for a communication device, which can be used both between deaf-mute people or with hearing impairment and between able-bodied people, which allows communication by exchanging data in order to keep the communication confidential.

SCOPE OF THE INVENTION

The object of the present invention is to overcome the above drawbacks, by realizing a communication device that allows a verbal communication between deaf or hearing impaired people by overcoming the common communication barriers due to the use of different languages, such as signs languages and verbal languages.

A further object is to overcome the above drawbacks by providing a communication device which can also be used between able-bodied people using different verbal languages or even between hearing impaired people using different sign languages.

A particular object is to provide a communication device that allows conversation in a natural way both between hearing impaired persons and between the hearing impaired and the able-bodied and also between able-bodied persons with a different native language.

These objects, as well as others which will become more apparent hereinafter, are achieved by a communication device which, according to claim 1, comprises a support structure suitable for being worn by a user at eye level, a first voice synthesizer integral to said support structure and provided with sensors adapted to detect the user's lip and to transform it into the corresponding words, emitting means for the emission of sound adapted to reproduce the words generated by said first synthesizer, a second synthesizer adapted to transform the sound produced by said emitting means into word processing, a possible but optional display fixed to said support structure in such a position as to be positioned in front of at least one eye of the user to graphically reproduce said word processor.

In this way, the user, whether he/her is deaf, with hearing impairment or able-bodied, may read in his/her own language what is expressed by his/her interlocutor in an immediate and fluid manner to converse easily and substantially in the absence of communication barriers.

The so designed device may be used both by deaf or hearing impaired persons to talk with other interlocutors, whether they are hearing impaired or able-bodied, and by hearing people to talk with other people speaking different languages.

The device may also be used by hearing impaired people to receive audio messages emitted by audio and/or audio-video devices, as well as by people with normal hearing to understand audio messages in a language other than their own.

Advantageous embodiments of the invention are obtained in accordance with the dependent claims.

BRIEF DISCLOSURE OF THE DRAWINGS

Further features and advantages of the object of the invention will become more apparent in the light of the detailed description of a preferred but not exclusive embodiment of the communication device according to the invention, illustrated by way of non-limiting example with the aid of the attached drawing tables wherein.

BEST MODES OF CARRYING OUT THE INVENTION

Figure 1:
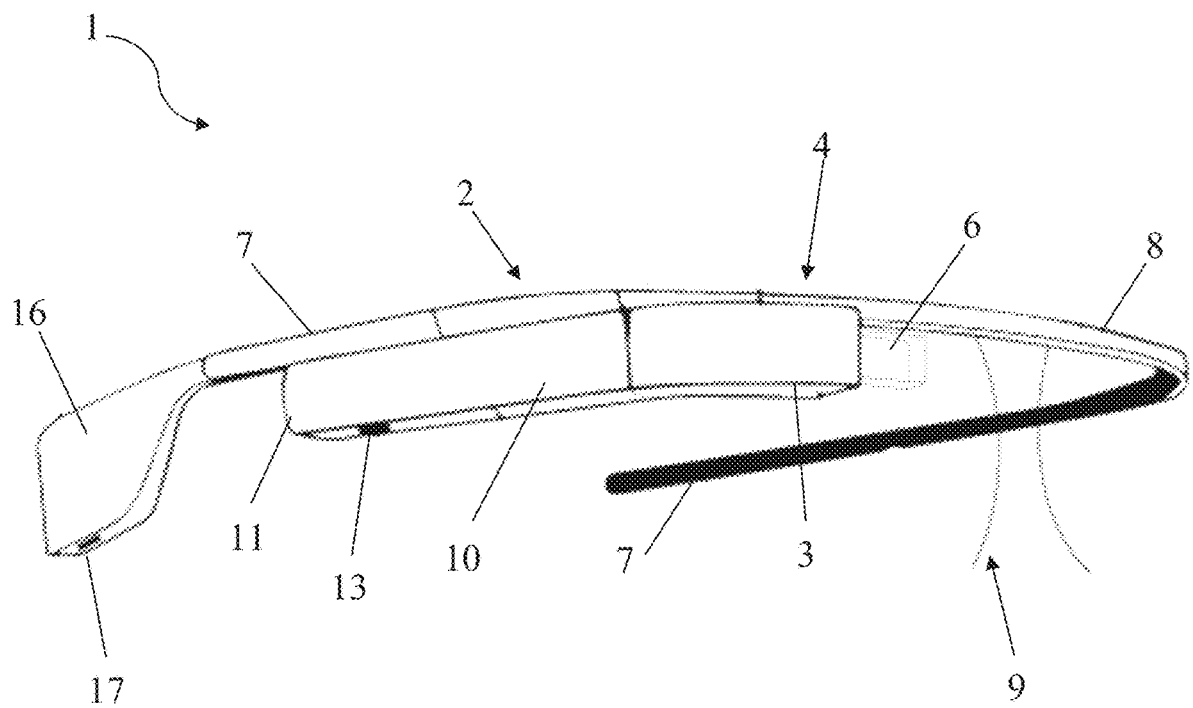
FIG. 1 is a perspective view of the communication device according to a first configuration and in a first mode of use.

FIG. 1 shows a first preferred but not exclusive configuration of the communication device according to the present invention, globally indicated with 1, suitable to be worn by a user on the face at the eye level.

The device 1 may be provided with its own support structure or may be integrated on a glasses frame already available for the user.

The communication device 1 essentially comprises a support structure 2 suitable for being worn by a user at eye level, a first synthesizer 3 integral with the support structure 2 and provided with sensors suitable for detecting the user's lip and for transforming it in the corresponding words, reproduction means 4 for the emission of sound and/or data and suitable for reproducing the words generated by the first synthesizer 3 and a second synthesizer 5 suitable for transforming the sound produced by said reproduction means 4 into word processing.

Preferably, but not exclusively, the first synthesizer 3 will be a speech synthesizer.

The second synthesizer 5 will be connected to a display 6 fixed to the support structure 2 in such a position as to be positioned in front of at least one eye of the user to graphically reproduce the word processor.

In this way, the user may read the words spoken by the interlocutor in real time, or corresponding to the interlocutor's lip, substantially in real time.

The presence of the second synthesizer 5 suitable for transforming the detected sounds into word processing will also make it possible to understand any audio messages transmitted by audio or audio-video devices or words spoken by persons if their lips cannot be detected.

In this sense, a possible variant of the device 1 may also provide for the absence or non-use of the first synthesizer 3.

As matter of fact, this configuration, although not suitable for communication between hearing impaired people who are not capable of generating sounds, will in any case be useful for communication between a hearing impaired user and an able-bodied or even hearing-impaired interlocutor but capable of emitting sounds corresponding to words.

In the same way, it may be used by the hearing impaired in order to understand audio messages or, again, for communication between able-bodied people who communicate in different languages.

According to the preferred but not exclusive configuration of the figures, the support structure 2 comprises a frame suitable for being worn by the user on the forehead and having a pair of lateral earpieces 7 suitable for being positioned on respective temples and a central section 8 possibly provided with one or more nose pads 9 for resting on the nose.

The display 6 will be placed at the central portion 8 or at one end of one of the lateral earpieces 7, possibly also in an adjustable manner, to be placed, in use, in front of one of the eyes.

In addition, the display 6 will comprise a prismatic screen designed to allow easy reading of the word processor while being placed close to the eye.

The support structure 2 will also comprise an arm 10 having a first end 11 hinged to one of the lateral earpieces 7 and a second free end 12 provided with the first synthesizer 3.

Figure 2:
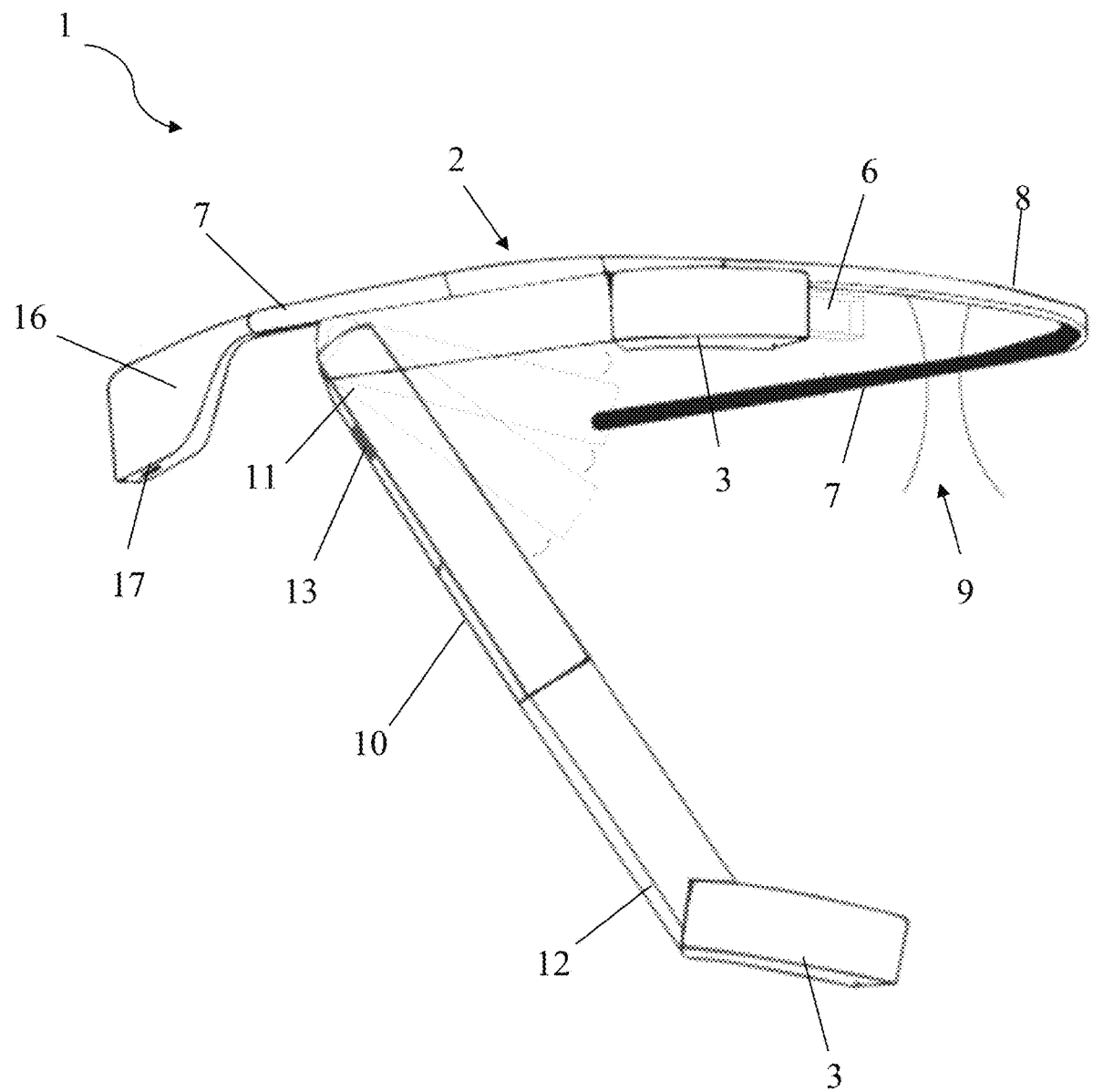
FIG. 2 is a perspective view of the communication device of FIG. 1 in a second mode of use.

In this way, as also visible from FIG. 2, the arm 10 may be rotated to adjust the position of the first synthesizer 3 and place it in the most suitable position for detecting one's own lip.

To this end, the arm 10 may have a telescopic structure, as in the figure, and/or the first synthesizer 3 may be constrained to the second end 12 of the arm 10 in an orientable manner around at least one axis of rotation.

The arm 10 may also be provided with a release button 13, the pressure of which will allow it to rotate.

Figure 3:
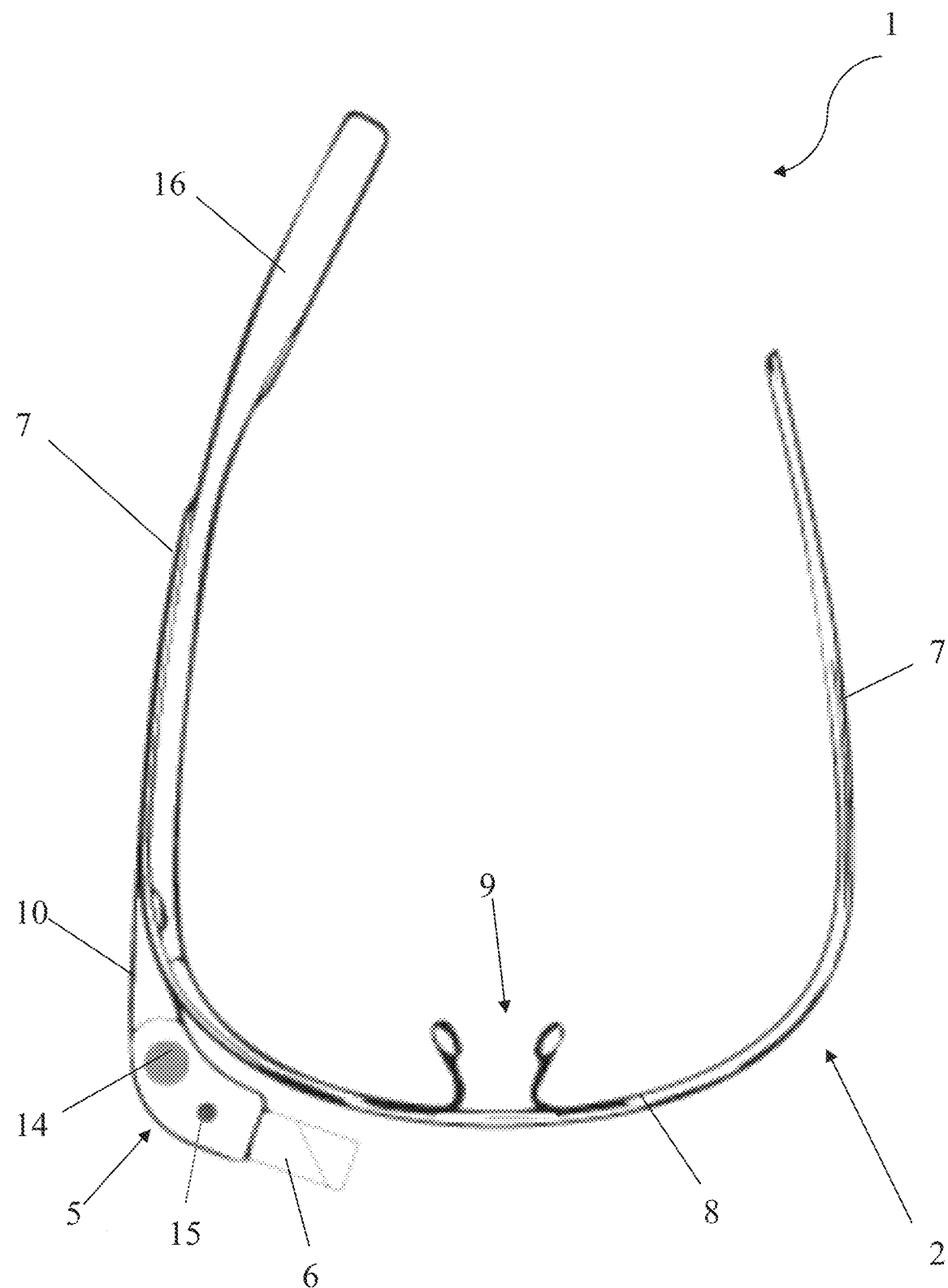
FIG. 3 is a top view of the communication device of FIG. 1.

As more clearly visible from FIG. 3, the reproduction means 4 suitable for emitting the sound comprise a loudspeaker 14 suitable for reproducing the words generated by the first synthesizer 3.

A microphone 15 is also provided for receiving both the words coming from the outside or emitted by the loudspeaker 14 of a further communication device, for example of the type described here, and worn by another interlocutor or by another source of words selected by the user.

The microphone 15 is connected to the second synthesizer 5 to transfer thereto the sound to be transformed into word processing.

The second synthesizer 5 may be provided with its own software for simultaneous linguistic translation or may be provided with means for connection to electronic devices provided with applications for simultaneous translation of the language.

For example, the electronic device may be a smartphone with a proper software application for simultaneous translation and the connection with the first synthesizer may take place wirelessly, for example via Bluetooth®, or via a cable connected via a connection port, such as USB, micro-USB or the like.

The power supply may be provided by one or more accumulators, preferably of the rechargeable type, not visible in the figures, and housed in a special compartment 16 made in the support structure 2.

To this end, the support structure 2 will be provided with a recharging port 17, such as a USB port or the like, for connecting the accumulators to electric recharging means and which may also be used for the connection with the electronic device provided with software application for simultaneous translation.

Figure 4:
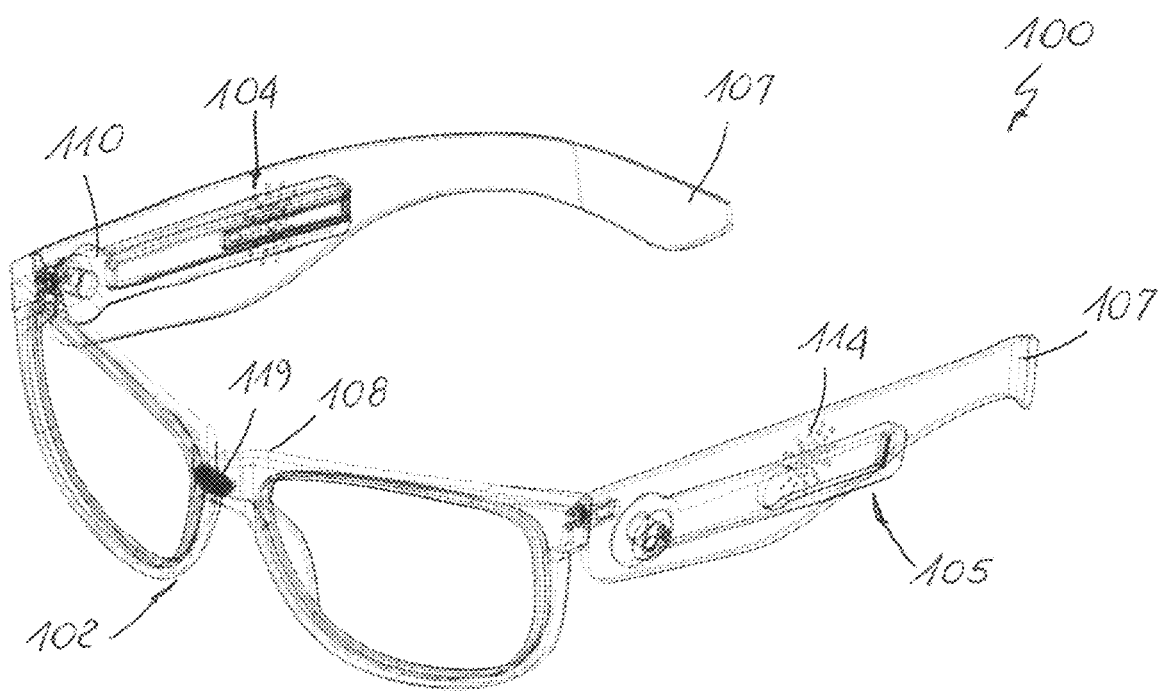
FIG. 4 is a perspective view of the communication device in a second configuration and in a configuration of non-use or only partial use.

FIG. 4 shows a second configuration of a communication device, globally indicated with 100, which differs from the previous one first of all in the configuration of the support structure 102, now designed as a glasses frame and therefore provided, other than with lateral earpieces 107 and with the central portion 108, also with two lenses 118, not necessarily of the graduated type.

In this configuration, one or both lenses 118 may integrate thereinside a display 106 for reproducing the text or images corresponding to the sounds detected and/or words spoken, even only through the lip, by the user, or detected by the second synthesizer 105.

However, in a simpler version, the communication device 100 may be completely devoid of a display. In this case it will be particularly suitable for communication between non-hearing impaired people who do not speak the same language in order to perform a simultaneous translation, thanks to the presence of the two synthesizers 103, 105 and to the presence of the reproduction means 104 that will provide, such as for the previous solution, to detect the lip of one of the interlocutors and to transmit it, in as audio and/or data, to the other device which will proceed, through special simultaneous translation software, to reproduce the speech of the first interlocutor in the language of the second interlocutor.

This configuration has the further advantage of being adapted to be worn, when not used for the communication function, like a normal pair of glasses, also allowing to be equipped, if necessary, with graduated lenses.

The translation may be reproduced through the loudspeaker 114 and/or on the screen on the display 106, if present.

Figure 5:
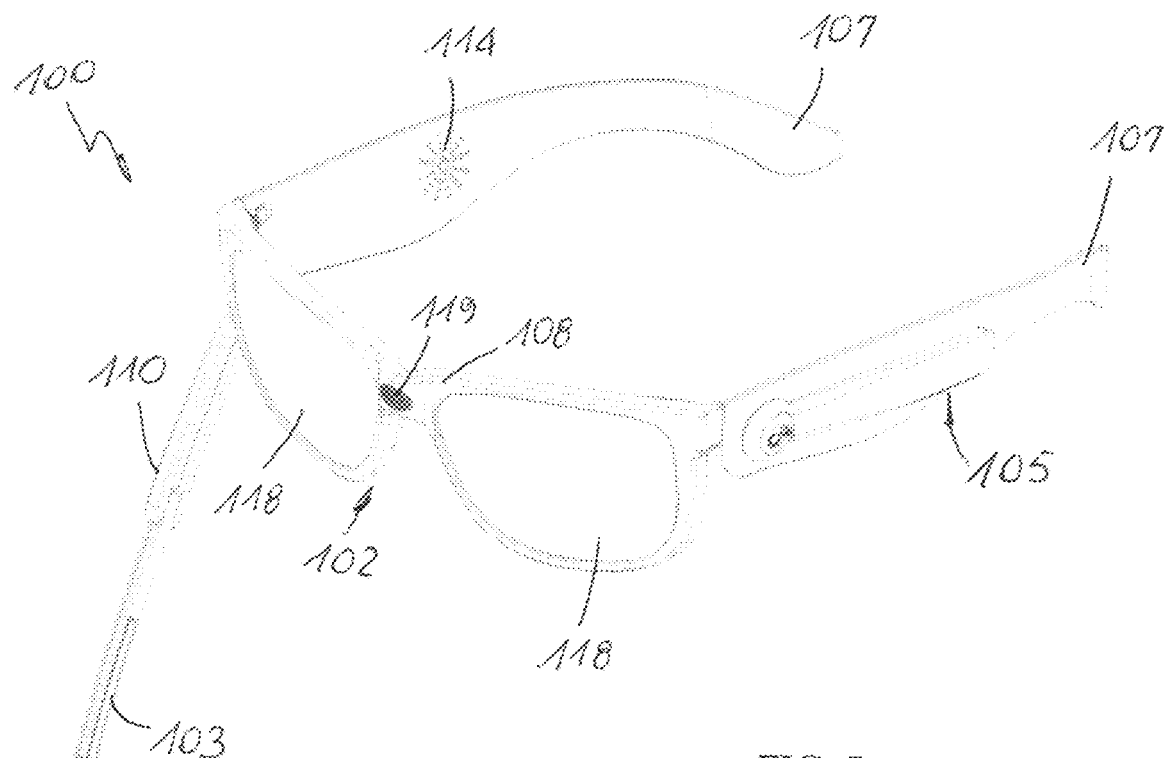
FIG. 5 is a perspective view of the communication device of FIG. 4 in the most complete condition of use.

The first synthesizer 103 will be positioned on an arm 110 hinged to one of the lateral earpieces 107 to be rotated and brought to the front position of the user's mouth only if necessary, as shown in FIG. 5.

In this configuration there may also be a microphone suitable to receive both the words coming from the outside or emitted by the loudspeaker 114 of a further communication device, for example of the type described here, and worn by another interlocutor or other source of words chosen by the user.

The device 100 will also be equipped with a front camera 119 having a software for the acquisition of codes, such as QR-Code, for the activation of audio messages associated with this code.

Figure 6:
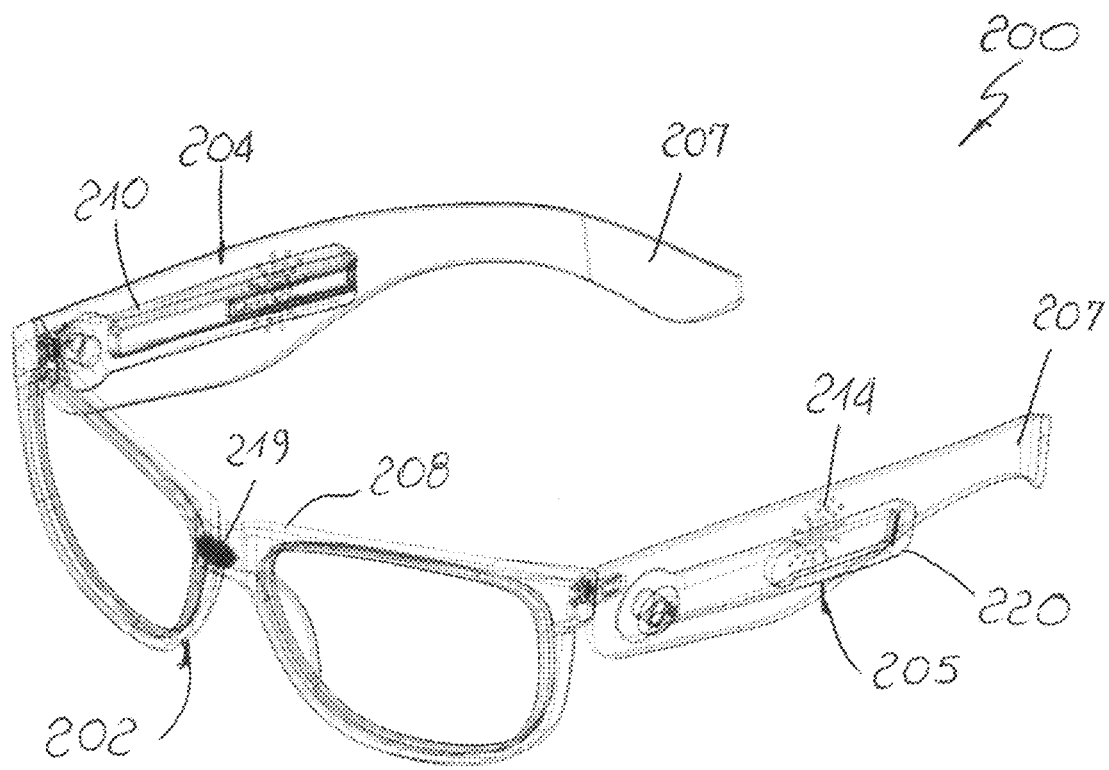
FIG. 6 is a perspective view of the communication device in a third configuration and in a configuration of non-use or only partial use.

This implementation will be useful, for example, to activate audio tracks to be reproduced through the loudspeakers 114 placed inside the two lateral earpieces 107, or in word processing on the display, allowing the hearing impaired, especially in this last example, to have all the information relating to works of art, paintings, sculptures, and the like, as in the case of visits to museums or in general to receive information. FIG. 6 shows a third configuration of a communication device, globally indicated with 200, which has in common with the previous one the eyeglass configuration of the support structure 202, with a pair of lateral earpieces 207 joined by a central portion 208.

Also in this solution there is a first synthesizer 203 placed on an arm 210 hinged on one of the lateral earpieces 207, provided with sensors suitable for detecting the user's lip and transforming it into the corresponding words, reproduction means 204 for the emission of sound and/or data and suitable to reproduce the words generated by the first synthesizer 203, a second synthesizer 205 suitable to turn the sound and/or data produced by said reproduction means 204 into sound and/or words and/or word processing, in a manner substantially similar to that described above for previous configurations.

There are also two loudspeakers 214 located inside the lateral earpieces 207 for audio playback, a possible microphone and the front camera 219, having the same functions described above.

Figure 7:
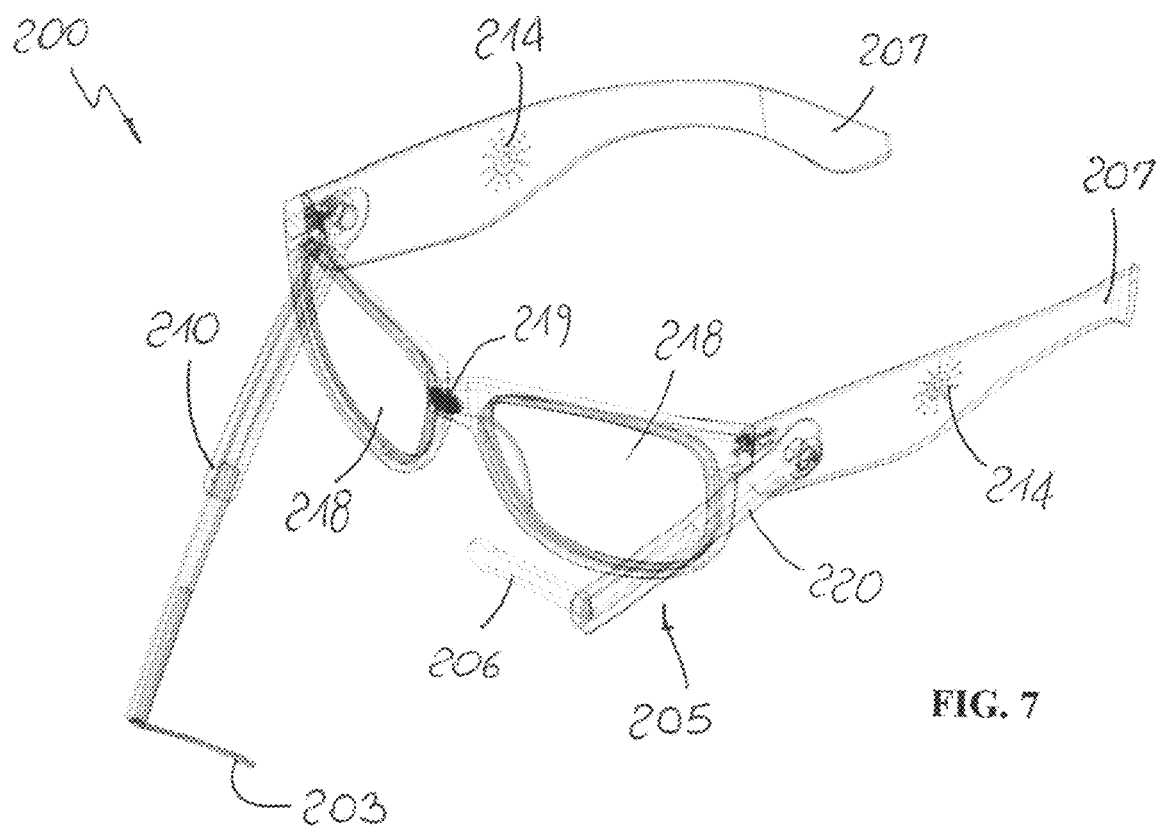
FIG. 7 is a perspective view of the communication device of FIG. 6 in the most complete condition of use.

In this configuration there is also a display 206 which may be integrated into one of the lenses 218 or, preferably, associated with a second hinged arm 220 or to one of the lateral earpieces 207, preferably on the opposite side to the first arm 210 and in such a position as to be arranged, in use, in front of one of the lenses 218, as shown in FIG. 7. In this way, the words acquired by the second synthesizer 205 may be reproduced on the display 206.

Therefore, the device 200 will be particularly suitable for communication between hearing impaired people, although it may also be used between people speaking different languages.

Thanks to the possibility of transferring the lip detected by one of the users even as non-audio data that can be reproduced in video writing on the display of another interlocutor having the same device, this configuration will lend itself to being used in all those contexts wherein it is necessary to keep a conversation secret, as in the case of uses for military scopes.

In this case, the communication devices 200 may be provided with special software for encrypting/decrypting the data.

The conversation may take place both through short-range data exchange, if the means of communication with which the devices 200 are provided use direct data exchange systems, for example based on Bluetooth protocol, and long-range if the means of communication may connect to the internet, satellite communication systems or other remote communication systems.

A further function for which the communication devices described above may be provided may be that of a device suitable for sending and receiving voice calls, for reading text and/or voice and/or video messages transmitted through the most common messaging applications, such as SMS, WhatsApp and the like.

The invention claimed is:

1. A communication device, comprising:
   a support structure designed to be worn by a user at eye level;
   a first synthesizer integral with said support structure and provided with one or more sensors suitable to detect an input produced by the user and transforming it into the corresponding words;
   reproduction means adapted to reproduce sound or data corresponding to the words generated by said first synthesizer;
   a second synthesizer suitable to turn the sound or data produced by said reproduction means and/or received from the outside into audio or word processing;
   wherein said one or more sensors are adapted to detect the user's lip movement and turn it into the corresponding words;
   wherein said support structure comprises a frame suitable for being worn by the user on the forehead and having lateral earpieces adapted to be positioned on a respective temple of the user and a central portion which connects said lateral earpieces;
   wherein said support structure comprises a first arm having a first end hinged to one of said lateral earpieces and a second free end provided with said first synthesizer.

2. Communication device as claimed in claim 1, comprising a display fixed to said support structure in such a position as to be positioned in use in front of at least one eye of the user to graphically reproduce said word processing.

3. Communication device as claimed in claim 2, wherein said display is provided with a prismatic screen and is positioned on said support structure in such a position as to be placed, in use, in front of one of the user's eyes.

4. Communication device as claimed in claim 1, wherein said support structure is shaped like a glasses frame and is provided with two lenses.

5. Communication device as claimed in claim 4, wherein said display is integrated in at least one of said lenses.

6. Communication device as claimed in claim 5, wherein said first synthesizer is a speech synthesizer.

7. Communication device as claimed in claim 6, characterized in that said reproduction means are adapted to emit sounds and comprise a loudspeaker adapted to reproduce the words generated by said first synthesizer, a microphone being also provided and suitable for receiving sound from external sources.

8. Communication device as claimed in claim 7, wherein said microphone is connected with said second synthesizer to transfer the sound to be transformed into audio.

9. Communication device as claimed in claim 7, wherein said microphone is connected with said second synthesizer to transfer the sound to be transformed into word processing.

10. Communication device as claimed in claim 1, wherein said reproduction means are adapted to transform the input detected by said one or more sensors into a data flow and to send said data flow to the second synthesizer of a different communication device.

11. Communication device as claimed in claim 10, wherein said reproduction means are suitable for encrypting/decrypting or encipher/decipher said data flow.

12. Communication device as claimed in claim 1, wherein said first arm has a telescopic or collapsible structure.

13. Communication device as claimed in claim 1, wherein said first synthesizer is constrained to said second end of said arm in an orientable manner around at least one axis of rotation.

14. Communication device as claimed in claim 1, wherein said second synthesizer is provided with software for simultaneous linguistic translation.

15. Communication device as claimed in claim 1, wherein said second synthesizer is provided with means for connection to electronic devices provided with simultaneous linguistic translation applications.

16. Communication device as claimed in claim 1, characterized by comprising one or more video cameras equipped with software for the acquisition of images and data and their translation into sounds or images to be reproduced on said display.

17. Communication device as claimed in claim 1, characterized by comprising one or more loudspeakers adapted to reproduce sounds.

18. Communication device as claimed in claim 1, comprising one or more rechargeable electric power supply accumulators, said support structure being provided with a recharging port, such as a USB port or the like, for the connection of said one or more accumulators to electric charging means.

* * * * *